(12) United States Patent
Toguchi (10) Patent No.: US 8,223,214 B2
(45) Date of Patent: Jul. 17, 2012

(54) CAMERA SYSTEM WITH MASKING PROCESSOR

(75) Inventor: Masaaki Toguchi, Toyota (JP)

(73) Assignee: Elmo Company, Limited (JP)

( * ) Notice: Subject to any disclaimer, the term of this patent is extended or adjusted under 35 U.S.C. 154(b) by 512 days.

(21) Appl. No.: 12/410,621

(22) Filed: Mar. 25, 2009

(65) Prior Publication Data
US 2009/0244327 A1    Oct. 1, 2009

(30) Foreign Application Priority Data

Mar. 26, 2008 (JP) .................... 2008-81353

(51) Int. Cl.
H04N 5/232 (2006.01)
H04N 7/18 (2006.01)

(52) U.S. Cl. ............... 348/211.9; 348/143; 348/207.99; 348/211.8

(58) Field of Classification Search ............ 348/207.99, 348/222.1, 211.9
See application file for complete search history.

(56) References Cited

U.S. PATENT DOCUMENTS

| | | | |
|---|---|---|---|
| 5,614,949 A * | 3/1997 | Suzuki et al. | 348/296 |
| 6,744,461 B1 * | 6/2004 | Wada et al. | 348/143 |
| 7,218,342 B2 * | 5/2007 | Kobayashi et al. | 348/211.8 |
| 7,423,667 B2 * | 9/2008 | Hayasaka | 348/143 |
| 7,508,415 B2 * | 3/2009 | Seo | 348/208.3 |
| 7,667,735 B2 * | 2/2010 | Ikeyama | 348/208.12 |
| 7,893,959 B2 * | 2/2011 | Miyata | 348/153 |
| 2005/0275723 A1* | 12/2005 | Sablak et al. | 348/169 |
| 2008/0036877 A1 | 2/2008 | Arima | |

FOREIGN PATENT DOCUMENTS

| | | |
|---|---|---|
| JP | 2008-51611 A | 2/1996 |
| JP | 2001-61137 A | 3/2001 |
| JP | 2001-69494 A | 3/2001 |
| JP | 2004-15362 A | 1/2004 |
| JP | 2004-146890 A | 5/2004 |
| JP | 2004-304847 A | 10/2004 |
| JP | 2006-86714 A | 3/2006 |
| JP | 2006-109507 A | 4/2006 |
| JP | 2008-42729 | 2/2008 |

OTHER PUBLICATIONS

Notice of Rejection mailed Dec. 13, 2011 in connection with corresponding Japanese Patent Application No. JP2008-081353.

Each item of information contained in this Information Disclsure Statement was first cited in a communication from a foreign patent office in a counterpart application and this communication was not received by any individual designated in section 1.56(c) more than thirty days prior to the filing of this Information Disclosure Statement.

* cited by examiner

*Primary Examiner* — Ngoc-Yen Vu
(74) *Attorney, Agent, or Firm* — Ostrolenk Faber LLP (57) ABSTRACT

A camera system includes a camera, a shooting field shifting mechanism, a shift amount acquiring unit, and a masking processor that masks a masking target within a captured image flame. The masking processor includes first and second position computing units, and mask area establishing unit. The first and second position computing units compute, based on the shift settings of the shooting field shifting mechanism, first and second relative positions of the masking target relative to the shooting field. The mask area establishing unit establishes a mask area to mask the masking target on the captured image flame, based on the first and second relative positions.

12 Claims, 8 Drawing Sheets

SET MASK AREA MA

Fig.4B

PAN OPERATION

TILT OPERATION

Fig.4C

ZOOM OPERATION

CAMERA SYSTEM WITH MASKING PROCESSOR

CROSS-REFERENCE TO RELATED APPLICATIONS

The present application claims the priority based on Japanese Patent Application No. 2008-81353 filed on Mar. 26, 2008, the disclosure of which is hereby incorporated by reference in its entirety.

BACKGROUND OF THE INVENTION

1. Field of the Invention

The present invention relates to a camera system, and relates in particular to a camera system that has a function of masking areas in a recorded image.

2. Description of the Related Art

In the field of camera systems such as surveillance cameras, there are known technologies adapted for masking objects in order to prevent them from being displayed out of a concern for protecting privacy etc. As an example, one such known technology taught by JP2004-146890A is adapted to take the mask position in a first frame image into consideration, to perform correction of mask position in the next frame image following the first frame image. However, with this conventional technology, when setting the mask position, no consideration is given to the exposure time of a single frame. A resultant risk is that of inability to accurately establish a mask area for the masking target within a frame image, e.g. of establishing a mask in an area that does not require it.

SUMMARY OF THE INVENTION

It is accordingly an object of the present invention to provide technology for use in a camera system having a masking function whereby a masking area for a masking target will be established with good accuracy.

According to one aspect of the present invention, there is provided a camera system. The system includes a camera that captures an image frame with a prescribed exposure interval, a shooting field shifting mechanism that shifts a shooting field of the camera, a shift amount acquiring unit that acquires shift settings of the shooting field shifting mechanism, and a masking processor that masks a masking target within a captured image flame. The masking processor includes: a first position computing unit that computes, based on the shift settings of the shooting field shifting mechanism at a first point in time during the exposure interval, a first relative position of the masking target relative to the shooting field at the first point in time; a second position computing unit that computes, based on the shift settings of the shooting field shifting mechanism at a second point in time during the exposure interval, a second relative position of the masking target relative to the shooting field at the second first point in time; and a mask area establishing unit that establishes a mask area to mask the masking target on the captured image flame, based on the first and second relative positions. According to this configuration, the masking area will be established accurately to mask a target in the captured image flame because the masking area is established based on the relative positions of the masking target at the first and second time points during the exposure interval.

In one embodiment, the first point in time is a start time of the exposure interval, and the second point in time is an end time of the exposure interval. The masking area will be established accurately in the captured image flame because the relative positions of the target are determined at the start and end of the exposure interval.

The shooting field shifting mechanism may include a pan rotation mechanism that moves the shooting field in left and right directions, and the shift settings acquired by the shift amount acquiring unit may include an amount of rotation by the pan rotation mechanism. According to this configuration, even if a panning operation has taken place during the exposure interval, the masking area will be established accurately to mask the target in the captured image.

The shooting field shifting mechanism may include a tilt rotation mechanism that moves the shooting field in up and down directions, and the shift settings acquired by the shift amount acquiring unit may include an amount of rotation by the tilt rotation mechanism. According to this configuration, even if a tilting operation has taken place during the exposure interval, nevertheless, the masking area will be established accurately to mask the target in the captured image.

The shooting field shifting mechanism may include a zoom mechanism for enlarging and reducing the shooting field, and the shift settings acquired by the shift amount acquiring unit may include an extent of zooming operation by the zoom mechanism According to this configuration, even if a zoom operation has taken place during the exposure interval, the masking area will be established accurately to mask the target in the captured image.

The camera may sequentially output the image frame, and the masking processor, in sync with sequential output of the captured image frames, may establish the mask area at an appropriate position in each image frame. Since there is no delay between each single frame and establishment of the masking area for synthesis with the frame, the masking area will be established more accurately to mask the target in the captured image.

There are any number of possible modes for working the invention, for example, apparatus inventions such as a camera system control device; or method inventions such as a camera system control method or a method for setting the masking area in a camera system having a masking function. Other possible modes of the invention could include a computer program for accomplishing the above methods through the agency of a computer; or a computer readable medium having such a computer program recorded thereon.

DESCRIPTION OF THE PREFERRED EMBODIMENT

A. Embodiment

Figure 1:
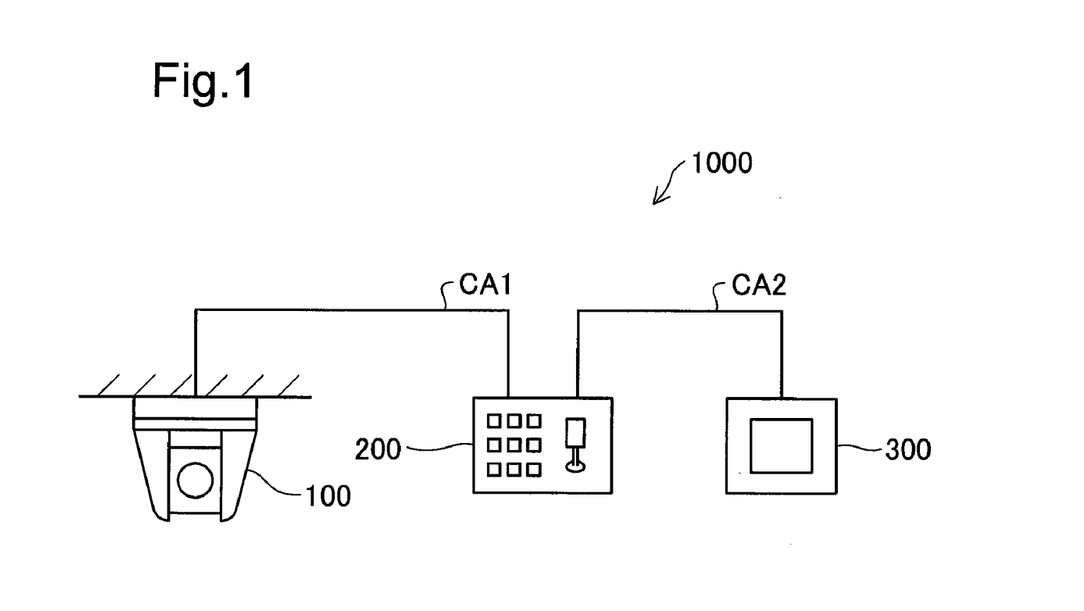
FIG. 1 is an illustration depicting a simplified arrangement for a camera system according to an embodiment of the present invention.

FIG. 1 is an illustration depicting a simplified arrangement for a camera system according to an embodiment of the present invention. The camera system 1000 includes a camera 100; a controller 200 for controlling the camera 100; and a monitor 200 for displaying images captured by the camera 100. The camera 100 and the controller 200 are connected by a cable CA1 enabling communication between them. The controller 200 and the monitor 300 are connected by a cable CA1 enabling communication between them.

Figure 2:
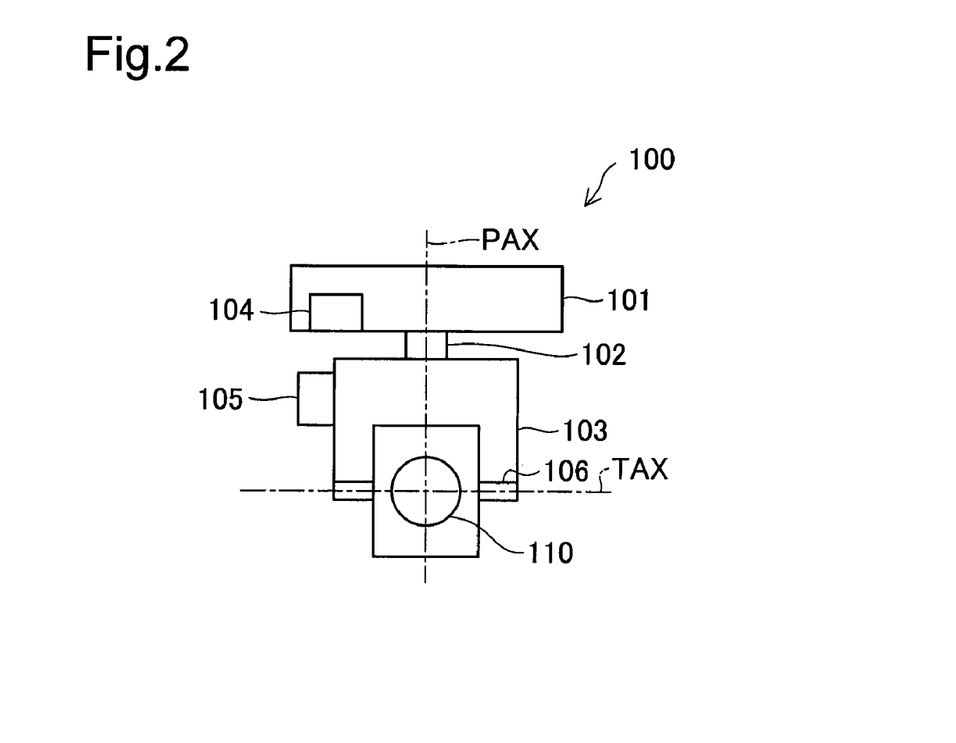
FIG. 2 is a diagram depicting the exterior arrangement of the camera with the cover removed.

FIG. 2 is a diagram depicting the exterior arrangement of the camera 100 with the cover removed. The camera 100 includes a fixed base 101, a slip ring 102, a pan base 103, a pan motor 104, a tilt motor 105, a tilt shaft 105, and a camera body 110. The fixed base 101 is fixed to a flat surface such as a ceiling. The pan base 103 connects to the fixed base 101 via the slip ring 102. The pan base 103 is adapted to rotate (pan) relative to the fixed base 101 about a pan axis PAX passing through the ring center of the slip ring 102. The pan motor 104 supplies power for rotating the pan base 103 relative to the fixed base 101. The camera body 110 is connected to the pan base 103 via the tilt shaft 106. The camera body 110 is adapted to rotate (tilt) relative to the pan base 103 about a tilt axis TAX passing through the center of the cross section perpendicular to the axial direction of the tilt shaft 106. The tilt motor 105 supplies power for tilting the camera body 110 relative to the pan base 103.

Figure 3:
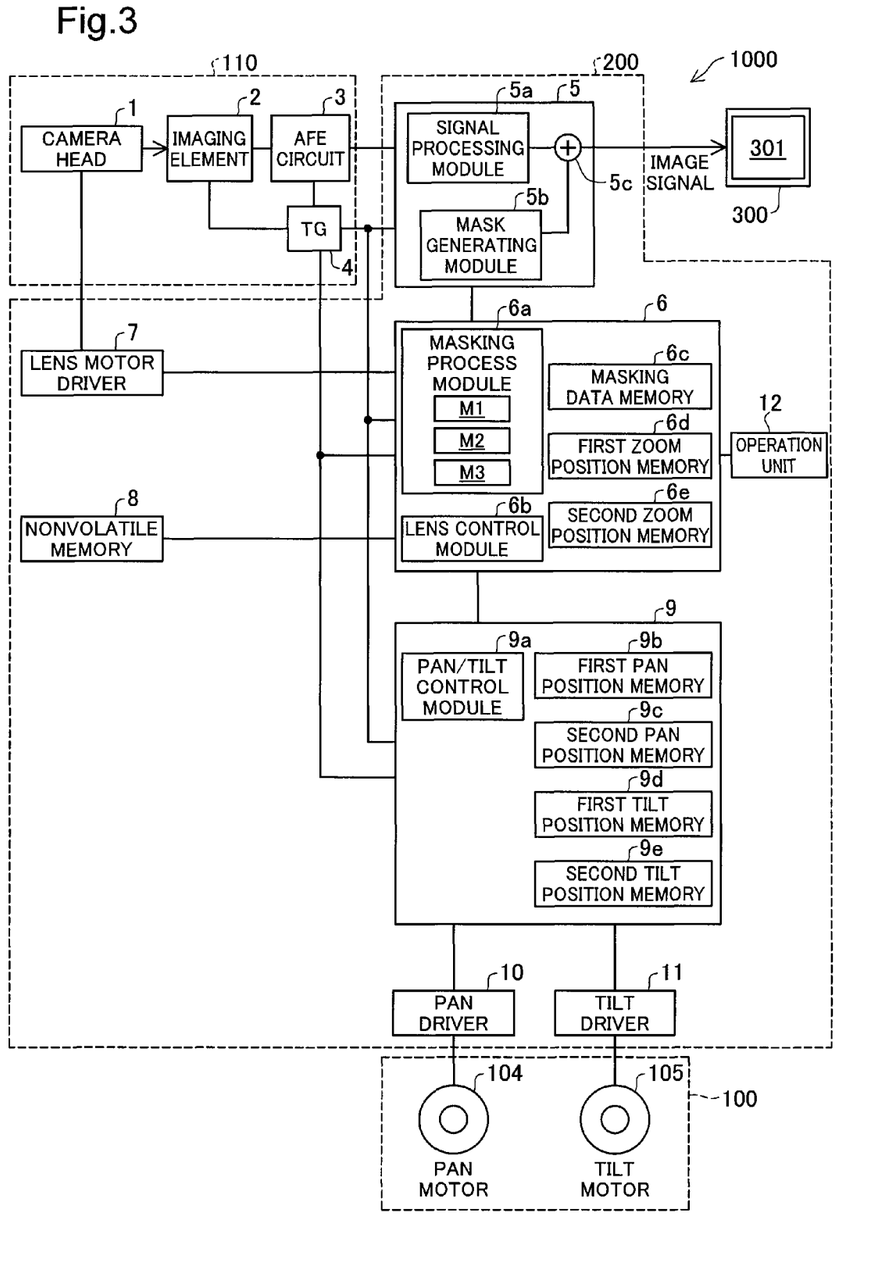
FIG. 3 is a block diagram depicting the internal arrangement of the camera system.

FIG. 3 is a block diagram depicting the internal arrangement of the camera system 1000. The camera body 110 includes a camera head 1, an imaging element 2, an analog front end circuit (AFE circuit) 3, and a timing generator (TG) 4. The camera head 1 includes (not shown) a zoom lens; a focusing lens; an aperture mechanism; and a zoom motor, a focusing motor, and an aperture motor for supplying power to these elements. The imaging element 2, using photoelectric conversion, converts the image that has been imaged onto the surface of the imaging element 2 via the lenses of the camera head 1 into an electrical signal. Exemplary imaging elements include CCD (Charge Coupled Device) image sensors, and CMOS (Complementary Metal Oxide Semiconductor) image sensors. The AFE circuit 3 is a circuit for converting the signal output by the imaging element 2 to a digital signal; the circuit may include, for example, a CDS circuit (Correlated Double Sampling circuit), an AGC circuit (Automatic Gain Control amp circuit), or an ADC circuit (Analog/Digital Converter). The timing generator 4 generates a pulse signal for driving the imaging element 2 and the AFE circuit 3. In one exemplary arrangement, the timing generator 4 generates a shutter pulse (discussed later) and presents it to the imaging element 2, as well as to the camera CPU 6 and pan/tilt CPU 9 (discussed later). The timing generator 4 is also adapted to generate a Read pulse that instructs readout of the signal from the imaging element 2, and present it to the imaging element 2. The timing generator 4 will generate the pulse signal in sync with a vertical sync signal VD generated by a DSP (discussed later).

The controller 200 includes a DSP (Digital Signal Processor) 5, a camera CPU 6, a lens motor driver 7, a nonvolatile memory 8, a pan/tilt CPU 9, a pan driver 10, a tilt driver 11, and an operation unit 12.

The DSP 5 includes a signal processing module 5a, a mask generating module 5b, and an adder 5c. The signal processing module 5a performs prescribed image processing (such as white balance correction and contrast correction) on the digital image signal received from the AFE circuit 3, and outputs the image-processed image signal. The mask generating module 5b, under instruction by the camera CPU 6, generates a mask image signal for the purpose of masking a mask area in an image. In the adder 5c, the mask image signal and the image signal output by the signal processing module 5a are synthesized to generate the image signal which is ultimately supplied to the monitor 300.

The camera CPU 6 is the main control unit for controlling the camera body 110 as well as for controlling the camera system 1000 as a whole. The camera CPU 6 is connected via a bus to the lens motor driver 7, the nonvolatile memory 8, the DSP 5, and the pan/tilt CPU 9 so as to be able to communicate therewith. The camera CPU 6 includes a masking process module 6a, a lens control module 6b, a masking data memory 6c, a first zoom position memory 6d, and a second zoom position memory 6e. The masking process module 6a includes as sub-modules a first mask position computation module M1, a second mask position computation module M2, and a mask area setting module M3. The processes carried out by the masking process module 6a will be discussed later. The lens control module 6b generates control signals for transmission to the lens motor driver 7, for the purpose of controlling the camera head 1 zoom position, focal position, and aperture position to their desired positions. The masking data memory 6c is a memory for saving masking settings data, described later. The first and second zoom position memories 6d, 6e are memories for storing zoom position at arbitrary timing.

The lens motor driver 7 operates the zoom motor, the focusing motor, and the aperture motor in accordance with control signals from the lens control module 6b.

The nonvolatile memory 8 is a memory for saving user settings information for the camera system 1000, and other such information that should be retained when the power is shut off. Masking settings data will be saved in the masking data memory 6c, as well as being saved to the nonvolatile memory 8. Once masking settings data has been set by the user, the masking settings data will be loaded into the masking data memory 6c from the nonvolatile memory 8 when the power is subsequently turned on.

The pan/tilt CPU 9 includes a pan/tilt control module 9a, a first pan position memory 9b, a second pan position memory 9c, a first tilt position memory 9d, and a second tilt position memory 9e. The pan/tilt control module 9a generates a control signal for transmission to the pan driver 10, for the purpose of controlling the pan position to a desired position in accordance with a position instruction from the camera CPU 6. The pan/tilt control module 9a also generates a control signal for transmission to the tilt driver 11, for the purpose of controlling the tilt position to a desired position in accordance with a position instruction from the camera CPU 6. The first and second pan position memories 9b, 9c are memories for storing pan position at arbitrary timing. The first and second tilt position memories 9d, 9e are memories for storing tilt position at arbitrary timing.

The pan driver 10 operates the pan motor 104 in accordance with a control signal from the pan/tilt control module 9a. The tilt driver operates the tilt motor 105 in accordance with a control signal from the pan/tilt control module 9a. The camera body 110 may be oriented in the desired direction thereby.

The operation unit 12 receives control operations from the user. For example, the operation unit 12 may include a direction reception portion for receiving pan operation and tilt operation commands (e.g. a joystick, cursor keys, or mouse), and control keys for receiving various settings including masking settings (described later) and instructions such as zoom operations.

The monitor 300 includes a display device 301. The display device 301 can be either a liquid crystal display or CRT display, or some other type of display.

Figure 4A:
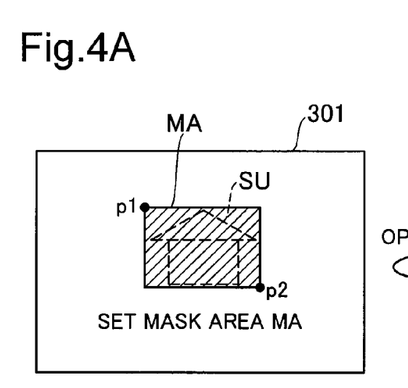
FIGS. 4A-4D are diagrams depicting the masking function.

FIGS. 4A-4D are diagrams depicting the masking function. The camera system 1000 is furnished with the masking function. In FIG. 4A, establishment of a mask area by the user is depicted. The user has established a mask area by specifying two points p1 and p2 on the video screen at a fixed pan position, tilt position, and zoom position. The established mask area MA is a rectangular area having the specified points p1 and p2 at its opposing corners. The established mask area MA is not limited to rectangular shape, and may instead be of circular shape or of polygonal shape, such as pentagon or hexagon shape. The mask area MA will be established so as to screen a prescribed target subject among those appearing in the video image at the time that the mask is established. In the example in FIG. 4A, the mask area MA has been established to as to screen a rectangular target that includes a house SU. Once the mask area MA has been established, in the image displayed on the display device 301 the masking target will appear replaced by pixels of a given color, for example. For example, white pixels or black pixels may be employed for the mask of the masking target.

Figure 4B:
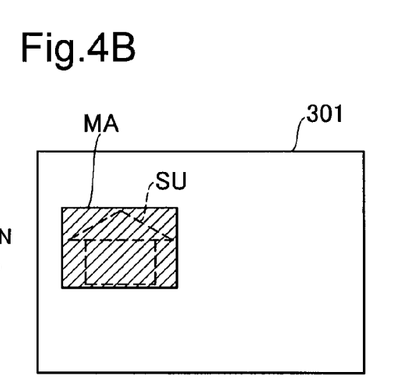
Figure 4C:
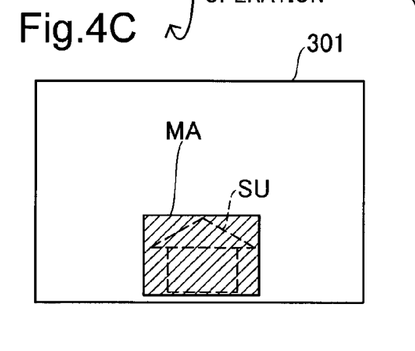
Figure 4D:
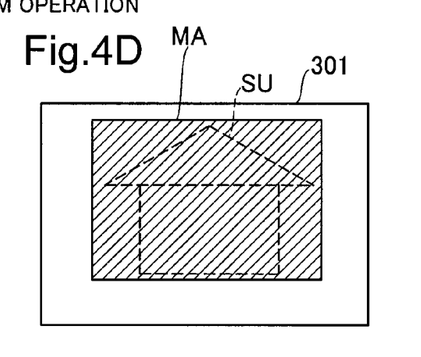

Subsequent to establishment of the mask area MA, if the shooting field shifts, the relative position of the masking target will also shift with respect to the shooting field. The mask area MA will shift in association with this shift. Thus, even after the shooting field has shifted, the masking target will remain masked on the display device 301. If for example a pan operation takes place after the mask area MA has been established, the relative position of the masking target with respect to the shooting field will shift in the left-right direction as depicted in FIG. 4B. In association with this shift, the mask area MA will shift in the left-right direction as well. As a result, the masking target will remain masked on the display device 301 even after pan operation. Shifting of the mask area MA will take place in analogous fashion where a tilt operation or zoom operation is performed, as depicted in FIGS. 4C and 4D.

Figure 5:
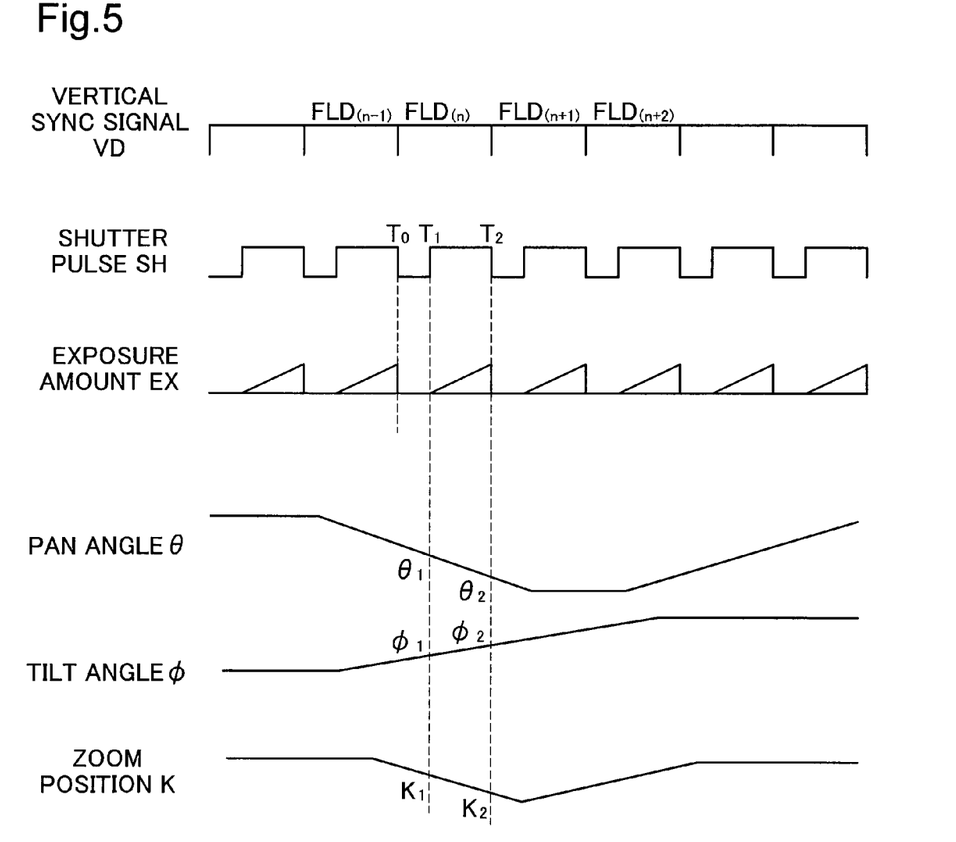
FIG. 5 is a timing chart describing operation of the camera system.

FIG. 5 is a timing chart describing operation of the camera system 1000. In FIG. 5, a vertical sync signal VD, a shutter pulse SH, an exposure amount EX, a pan angle θ, a tilt angle φ, and a zoom position K are shown. The pan angle θ, the tilt angle φ, and the zoom position K are values respectively representing pan position, tilt position, and zoom position. These positions are values that represent the amount of shift of the shooting field from a reference position.

The vertical sync signal VD is a pulse signal representing delineation between single fields FLD. In the present embodiment, a single frame of the captured image is output in each single field FLD. The interval of a single field FLD is 1/60 second, for example. Herein, an n-th field which will serve as a reference point in the description is designated FLD(n). For example, the field immediately following field FLD(n) shall be designated as field FLD(n+1), and the field immediately preceding field FLD(n) shall be designated as field FLD(n−1).

The shutter pulse SH is a signal for specifying an exposure interval to expose the surface of the imaging element 2 during each single field FLD interval. The interval during which the shutter pulse SH is high level represents the exposure interval, and the interval during which it is low level represents the non-exposure interval. For example, in field FLD(n), the interval from time $T_1$ to time $T_2$ is the exposure interval. The mode of the shutter pulse SH shown here is merely exemplary, and other modes is possible. For example, a shutter pulse in which the exposure interval is represented by low level would be acceptable; as would a shutter pulse that includes short pulse signals at the start time and end time of the exposure interval.

Turning now to a description of operation in field FLD(n), the imaging element 2 is reset during the interval between time $T_0$ and time $T_1$, and charge does not accumulate in the photodiodes of the imaging element 2. At time $T_1$, when the shutter pulse SH goes to high level the photodiodes of the imaging element 2 will begin to accumulate charge in accordance with the exposure amount. Also, at time $T_1$, the lens control module 6b will save the zoom position $K_1$ at time $T_1$ to the first zoom position memory 6d. The pan/tilt control module 9a will save the pan angle $\theta_1$ at time $T_1$ to the first pan position memory 9b, and the tilt angle $\phi_1$ at time $T_1$ to the first tilt position memory 9d, respectively.

Just prior to time $T_2$, the imaging element 2 will be presented with a Read pulse from the timing generator 4, whereupon the imaging element 2 will begin transfer of accumulated charge in the photodiodes to the AFE circuit 3. At time $T_2$, when the shutter pulse SH goes to low level, the imaging element 2 will reset. Also, at time $T_2$ the lens control module 6b will save the zoom position $K_2$ at time $T_2$ to the second zoom position memory 6e. The pan/tilt control module 9a will save the pan angle $\theta_2$ at time $T_2$ to the second pan position memory 9c, and the tilt angle $\phi_2$ at time $T_2$ to the second tilt position memory 9e, respectively.

The accumulated charge in the photodiodes of the imaging element 2 in field FLD(n) will be transferred to the AFE circuit 3 in field FLD(n+1). Also, the analog signal that was transferred to the AFE circuit 3 in field FLD(n+1) will be will be converted to a digital signal by the AFE circuit 3 in the same field FLD(n+1), and presented to the signal processing module 5a of the DSP 5.

During the field FLD(n+1) interval, the masking process module 6a of the camera CPU 6 will execute a mask position computation process to compute the position of the mask area that is to be superimposed on the frame image signal that was exposed during field FLD(n).

Figure 6:
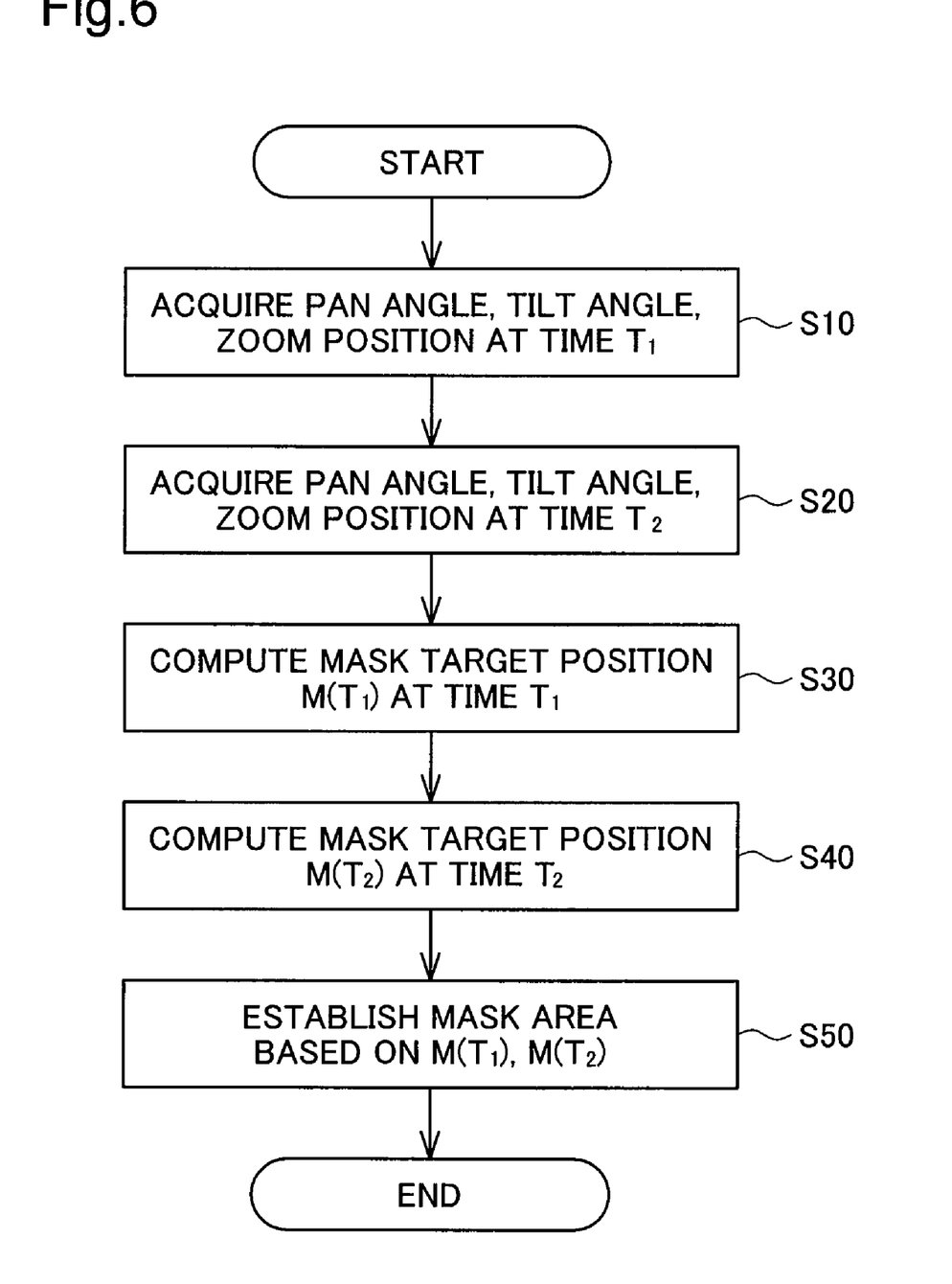
FIG. 6 is a flowchart showing the process steps of the mask position computation process.

FIG. 6 is a flowchart showing the process steps of the mask position computation process. In Step S10, the masking process module 6a acquires the pan angle $\theta_1$, the tilt angle $\phi_1$, and the zoom position $K_1$ at time $T_1$ from the first pan position memory 9b, the first tilt position memory 9d, and the first zoom position memory 6d, respectively. In Step S20, the masking process module 6a acquires the pan angle $\theta_2$, the tilt angle $\phi_2$, and the zoom position $K_2$ at time $T_2$ from the second pan position memory 9c, the second tilt position memory 9e, and the second zoom position memory 6e, respectively.

In Step S30, the first mask position computation module M1 of the masking process module 6a computes a masking target position $M(T_1)$ at time $T_1$. The masking target position $M(T)$ represents representative points of the masking target which are defined relative to the shooting field at time T.

Figure 7:
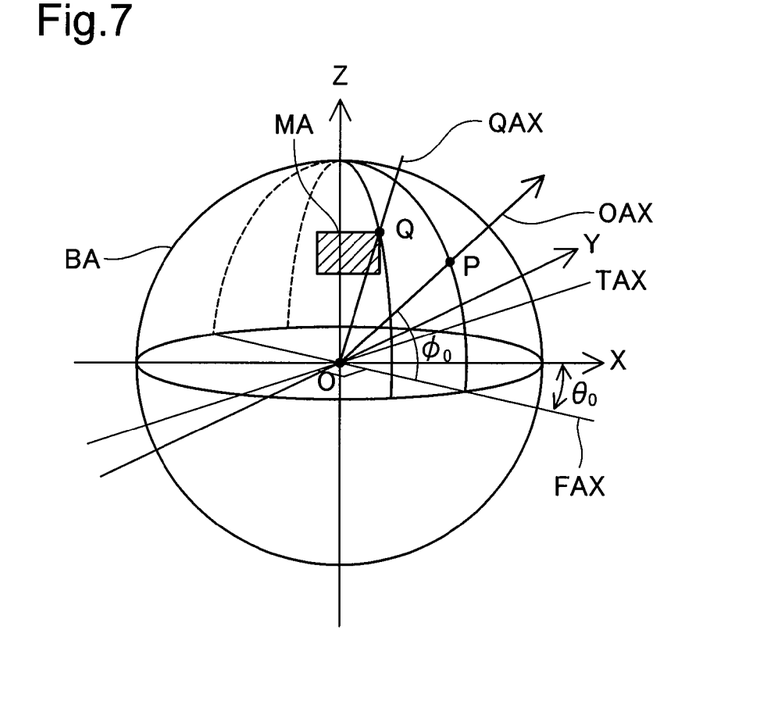
FIG. 7 is a diagram describing the pan/tilt coordinates.

FIG. 7 is a diagram describing the pan/tilt coordinates. Pan/tilt coordinates are represented by (θ, φ) where θ denotes a pan angle, and φ denotes a tilt angle. Pan/tilt coordinates are coordinates that represent points of intersection between a straight line passing through the center point O of the coordinate system, and a sphere BA of radius r centered on the center point O. Point P is an intersection between the optical axis OAX and the sphere BA; its pan/tilt coordinates are ($\theta_0$, $\phi_0$). As will be understood from FIG. 7, the pan axis is the Z axis. The optical axis OAX and the tilt axis TAX rotate by pan rotation. The tilt axis TAX lies in the X-Y plane (pan plane). A line FAX represents the line of intersection between the X-Y plane and the plane through which the optical axis moves when tilt operations are carried out about the tilt axis TAX. That is, the optical axis OAX lies on a plane that includes the line FAX and the Z axis. Here, a vertex of the masking target defined by the masking target position M(T) will be designated as Q, and the pan/tilt coordinates of Q will be designated as ($\theta_n$, $\phi_n$).

Figure 8:
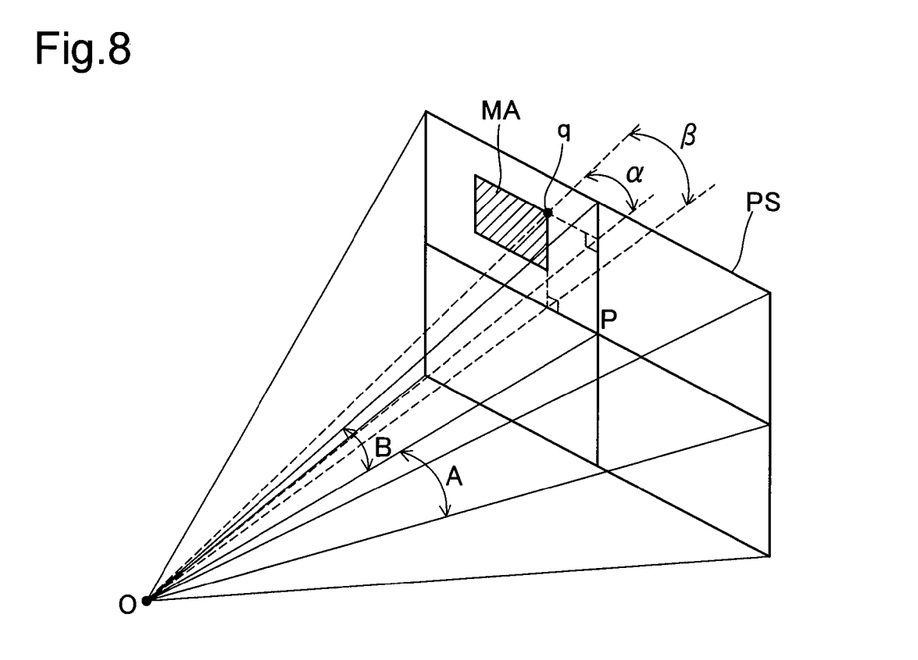
FIG. 8 is a diagram describing the camera coordinates.

FIG. 8 is a diagram describing the camera coordinates. The camera coordinates are coordinates that represent locations of points on a projection plane PS or a shooting field, where the subject is projected on the pane PS by a perspective projection with the origin O as the point of sight. Camera coordinates will be represented by ($\alpha$, $\beta$), where $\alpha$ is the horizontal angle with respect to the optical axis OP, and $\beta$ is the vertical angle with respect to the optical axis OP. In FIG. 8, A represents the horizontal half-angle of view of the camera, and B represents the vertical half-angle of view of the camera. The horizontal half-angle of view corresponds to zoom position K. Specifically, once the zoom position K has been decided, the focal distance will be decided, and the horizontal half-angle of view A and vertical half-angle of view will be determined uniquely from the size of the imaging plane of the imaging element 2. Camera coordinates of a point q on the projection plane PS, which is a projection of the point Q in FIG. 7, are designated as ($\alpha_n$, $\beta_n$).

Figure 9:
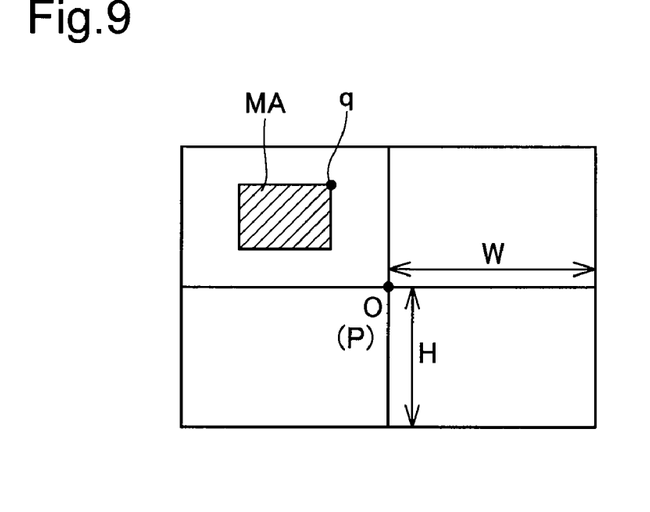
FIG. 9 is diagram describing the monitor coordinates.

FIG. 9 is diagram describing the monitor coordinates. The coordinate system of the monitor coordinates will differ depending on the number of pixels of the display device 301; for example, for an XGA (eXtended Graphics Array: horizontal 1024×vertical 768) monitor, a planar coordinate system (X,Y) where $-516 \leq X \leq +516$, $-384 \leq Y \leq +384$ would be used. Here, the pixel count in the horizontal direction shall be designated as 2W, and the pixel count in the vertical direction shall be designated as 2H.

As will be understood from the description above, the masking target position M(T) indicative of positions of the representative points of the masking target can be computed through appropriate conversion of the monitor coordinates, the camera coordinates, and the pan/tilt coordinates using known equations.

Figure 10:
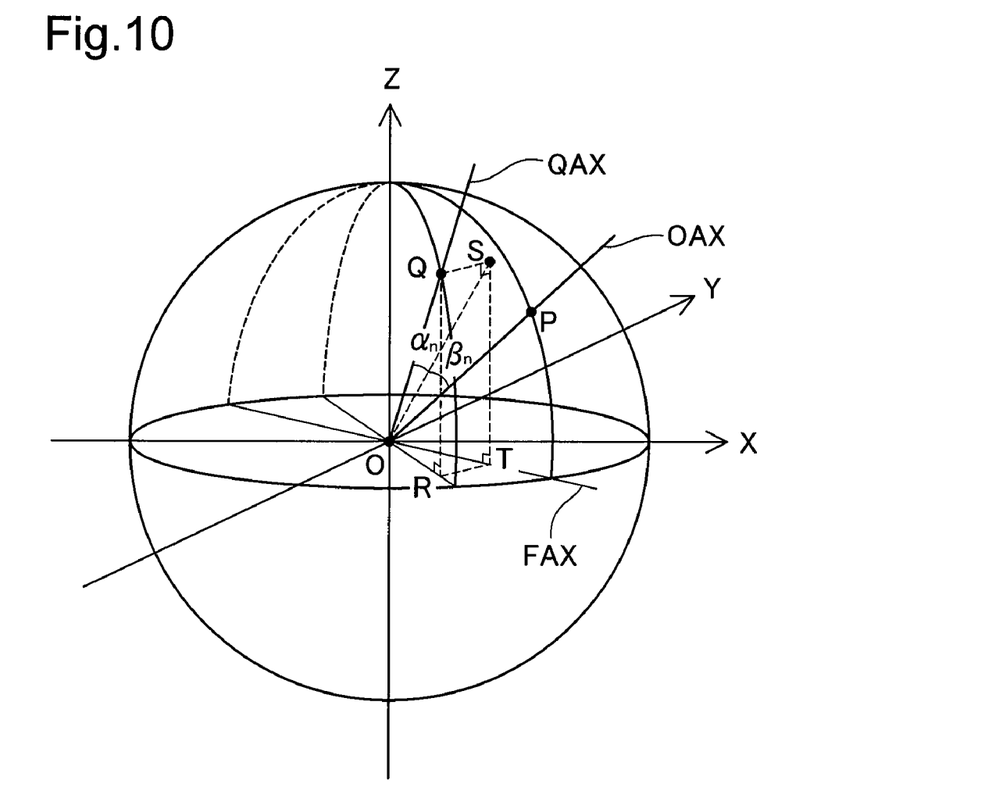
FIG. 10 depicts an example of conversion from pan/tilt coordinates to camera coordinates.

FIG. 10 depicts an example of conversion from pan/tilt coordinates to camera coordinates. For example, let ($\alpha_n$, $\beta_n$) designate a point of camera coordinates corresponding to point Q($\theta_n$, $\phi_n$) in the pan/tilt coordinates. Thus, $\alpha_n = \angle SOQ$ and $\beta_n = \angle POS$. Here, point S is a point derived by vertical projection of Q onto the tilt plane. The tilt plane is a plane that includes the tilt axis FAX and the Z axis. These angles can be calculated by an equation using the coordinates of a point R derived by vertical projection of point Q onto the pan plane, and of a point T derived by vertical projection of point S onto the pan plane.

The discussion continues referring back to FIG. 6. The masking settings data that has been saved to the masking data memory 6c includes information represented by the pan/tilt coordinates in the shooting field at the time of setting of points identifying the masking target. In the present embodiment, in which the masking target has a rectangular shape, the points representing the masking target will be points p1 and p2 in FIG. 4A for example. By calculating the monitor coordinates of points p1 and p2 with the pan angle $\theta_1$ and the tilt angle $\phi_1$ at time $T_1$ as the optical axis OAX, and at the horizontal half-angle of view A corresponding to the zoom position K at time $T_1$, the masking target position M($T_1$) at time $T_1$ can be computed.

In Step S40, the second mask position computation module M2 of the masking process module 6a will compute the masking target position M($T_2$) at time $T_2$. The computation method is analogous to the computation method for the masking target position M($T_1$) in Step S30. In Step S50, mask area setting module M3 of the masking process module 6a will establish a mask area MA on the basis of the masking target position M($T_1$) and the masking target position M($T_2$).

Figure 11:
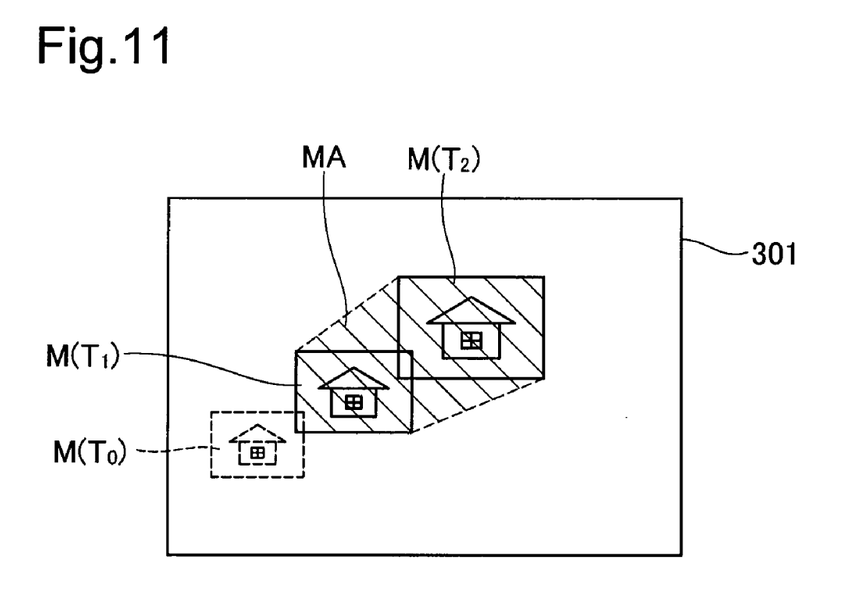
FIG. 11 is a diagram depicting setting of a range for the mask area MA.

FIG. 11 is a diagram depicting setting of a range for the mask area MA. The mask area MA is established with hexagonal shape, using the six vertexes from among the four vertexes defined by the masking target position M($T_1$) and the four vertexes defined by the masking target position M($T_2$). Once the range of the mask area MA has been set, the mask position computation process will terminate.

Once the mask position computation process has taken place in field FLD(n+1), the mask generating module 5b will be notified of the established mask area MA.

In field FLD(n+2), the digital signal of the frame image that was exposed in field FLD(n) will undergo prescribed image processing by the signal processing module 5a, and output. Also, in field FLD(n+2) the mask generating module 5b will generate and output a mask image signal representing a mask image, so as to screen the location of the mask area MA of which it was notified by the masking process module 6a.

In field FLD(n+3), the monitor 300 will be presented with an image signal resulting from superimposition by the adder 5c of the frame image signal that is output by the signal processing module 5a, and the mask image signal that is output by the mask generating module 5b. In this way, the signal of the frame that was exposed in field FLD(n), and the image signal of the mask area MA determined with consideration to exposure time in the field FLD(n), will be output with identical timing in field FLD(n+3).

The signal of the frame image that is exposed in field FLD(n+1) will be superimposed with the corresponding mask area MA in FLD(n+4), and the signal of the frame image that is exposed in field FLD(n+2) will be superimposed with the corresponding mask area MA in FLD(n+5), respectively, then output.

According to the embodiment described above, the range and location of the mask area MA is established on the basis of the masking target position M($T_1$) at the start time $T_1$ of the exposure interval, and the masking target position M($T_2$). As a result, it will be possible establish the range and position of the mask area MA in a highly accurate manner, so as to prevent the masking target from being shown on the monitor 300 while showing as much as possible of the area outside the masking target.

Figure 12:
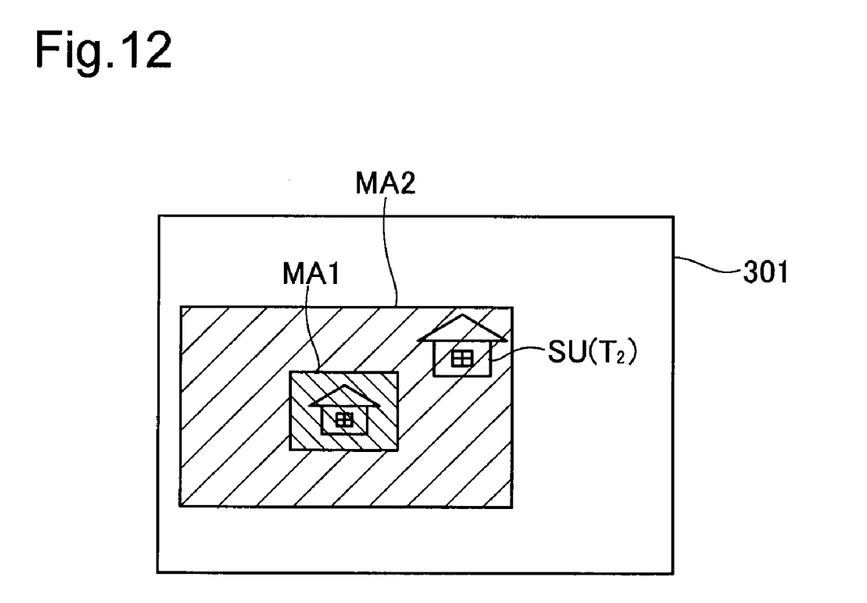
FIG. 12 is a drawing depicting a mask area MA1 and a mask area MA2 in a comparative example.

FIG. 12 is a drawing depicting a mask area MA1 and a mask area MA2 in a comparative example. In the comparative example, the mask area is established only on the basis of the pan angle $\theta$, the tilt angle $\phi$, and the zoom position K at the start time $T_1$ of the exposure interval. If a small mask area like mask area MA1 has been established, the masking target SU($T_2$) that was exposed in proximity to the end time $T_2$ of the exposure interval will be visible outside the mask area MA1. If a large mask area like mask area MA2 has been established, while the masking target will not be visible, broad areas outside the masking target will not be visible either. In the present embodiment, the mask area MA will be established with good accuracy so as to avoid such problems.

Moreover, even when the shutter speed is fast or when the exposure interval is short, an appropriately sized mask area MA will be established for individual frame images, according to the shutter speed. Additionally, there is no need to provide a special circuit for detecting shutter speed or exposure interval.

B. Modified Embodiments

Modified Embodiment 1

Whereas in the preceding embodiment, masking target location M(T) is computed at the start time $T_1$ and at the end time $T_2$ of the exposure interval, it is acceptable to instead compute masking target location at two other points in time during the exposure interval. However, where the masking target locations at the start time $T_1$ of the exposure interval and the end time $T_2$ are taken into consideration as taught in the embodiment, the mask area MA will be established with improved accuracy, as compared to where two other intermediate points are considered.

Modified Embodiment 2

Whereas in the preceding embodiment, masking target location M(T) is computed at the start time $T_1$ and at the end time $T_2$ of the exposure interval, it is acceptable to instead compute masking target location at three points in time, rather than two points in time. For example, an additional masking target position $M(T_3)$ may be computed at a time $T_3$ lying between the start time $T_1$ and at the end time $T_2$, and the mask area MA established on the basis of the three masking target positions $M(T_1)$, $M(T_2)$, $M(T_3)$.

Modified Embodiment 3

In the preceding embodiment, a shutter pulse SH is used for detecting timing of the start time $T_1$ and at the end time $T_2$ of the exposure interval, but this may be accomplished by some other method instead. For example, the shutter pulse SH is generated in sync with the vertical sync signal VD, based on shutter speed set by the camera CPU 6. Thus, the camera CPU 6 is aware of the shutter speed beforehand. For this reason, the camera CPU 6 need not rely on the shutter pulse SH, but may instead recognize the timing of the start time $T_1$ and at the end time $T_2$ of the exposure interval in sync with the vertical sync signal VD.

Modified Embodiment 4

In the preceding embodiment, the mask image generated by the mask generating module 5b is a monochrome image composed of white or black pixels, but the mask image may instead be an image of a prescribed pattern, such as a checkerboard pattern for example. The mask image may also be a mosaiced image of the masking target. Herein, the term masking of an area is used to include rendering a prescribed area of the image monochrome, rendering it an image with a prescribed pattern, or rendering it a mosaiced image. In other words, the masking process refers to any process that obscures the original image or process that makes it difficult to see.

Modified Embodiment 5

The modules or units implemented by hardware may be implemented by software instead, and those implemented by software may be implemented by hardware.

What is claimed is:

1. A camera system comprising:
    a camera that captures an image frame with a prescribed exposure interval;
    a shooting field shifting mechanism that shifts a shooting field of the camera;
    a shift amount acquiring unit that acquires shift settings of the shooting field shifting mechanism; and
    a masking processor that masks a masking target within a captured image frame;
    wherein the masking processor includes:
        a first position computing unit that computes, based on the shift settings of the shooting field shifting mechanism at a first point in time during the exposure interval, a first relative position of the masking target relative to the shooting field at the first point in time;
        a second position computing unit that computes, based on the shift settings of the shooting field shifting mechanism beginning at a second point in time following the first point in time during the exposure interval, a second relative position of the masking target relative to the shooting field at the second point in time; and
        a mask area establishing unit that establishes a single continuous mask area to mask the masking target at both the first relative position and the second relative position on the captured image frame, said mask area including both the first and second relative positions computed by the masking processor.

2. The camera system according to claim 1 wherein the first point in time is a start time of the exposure interval, and the second point in time is an end time of the exposure interval.

3. The camera system according to claim 1, wherein
    the shooting field shifting mechanism includes a pan rotation mechanism that moves the shooting field in left and right directions, and
    the shift settings acquired by the shift amount acquiring unit include an amount of rotation by the pan rotation mechanism.

4. The camera system according to claim 1, wherein
    the shooting field shifting mechanism includes a tilt rotation mechanism that moves the shooting field in up and down directions, and
    the shift settings acquired by the shift amount acquiring unit include an amount of rotation by the tilt rotation mechanism.

5. The camera system according to claim 1, wherein
    the shooting field shifting mechanism includes a zoom mechanism for enlarging and reducing the shooting field, and
    the shift settings acquired by the shift amount acquiring unit include an extent of zooming operation by the zoom mechanism.

6. The camera system according to claim 1, wherein
    the camera sequentially outputs the image frame, and
    the masking processor, in sync with sequential output of the captured image frames, establishes the mask area at an appropriate position in each image frame.

7. A method of controlling a camera system including a camera that captures an image frame with a prescribed exposure interval, and a shooting field shifting mechanism that shifts a shooting field of the camera, the method comprising the steps of:
    (a) acquiring first shift settings of the shooting field shifting mechanism at a first point in time during the exposure interval;
    (b) acquiring second shift settings of the shooting field shifting mechanism beginning at a second point in time following the first point in time during the exposure interval;
    (c) computing a first relative position of the masking target relative to the shooting field at the first point in time, based on the first shift settings;

(d) computing a second relative position of the masking target relative to the shooting field at the second point in time, based on the second shift settings; and
(e) establishing a single continuous mask area to mask the masking target at both the first relative position and the second relative position on the captured image frame, said mask area including both the first and second computed relative positions.

8. The method according to claim 7, wherein
the first point in time is a start time of the exposure interval, and the second point in time is an end time of the exposure interval.

9. The method according to claim 7, wherein
the shooting field shifting mechanism includes a pan rotation mechanism that moves the shooting field in left and right directions, and
the shift settings include an amount of rotation by the pan rotation mechanism.

10. The method according to claim 7, wherein
the shooting field shifting mechanism includes a tilt rotation mechanism that moves the shooting field in up and down directions, and
the shift settings include an amount of rotation by the tilt rotation mechanism.

11. The method according to claim 7, wherein
the shooting field shifting mechanism includes a zoom mechanism for enlarging and reducing the shooting field, and the shift settings include an extent of zooming operation by the zoom mechanism.

12. The method according to claim 7, wherein
the camera sequentially outputs the image frame, and
the masking processor, in sync with sequential output of the captured image frames, establishes the mask area at an appropriate position in each image frame.

* * * * *